(12) United States Patent
Hirose

(10) Patent No.: US 8,817,165 B2
(45) Date of Patent: Aug. 26, 2014

(54) IMAGE CAPTURING APPARATUS

(75) Inventor: Minoru Hirose, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 391 days.

(21) Appl. No.: 13/147,020

(22) PCT Filed: Oct. 6, 2010

(86) PCT No.: PCT/JP2010/067993
§ 371 (c)(1),
(2), (4) Date: Jul. 29, 2011

(87) PCT Pub. No.: WO2011/055617
PCT Pub. Date: May 12, 2011

(65) Prior Publication Data
US 2011/0285899 A1    Nov. 24, 2011

(30) Foreign Application Priority Data
Nov. 9, 2009   (JP) .................... 2009-256542

(51) Int. Cl.
*H04N 5/232*   (2006.01)
*G03B 17/00*   (2006.01)
*G02B 7/28*   (2006.01)

(52) U.S. Cl.
USPC ........... 348/345; 348/349; 348/350; 348/353; 396/79; 396/80; 396/111

(58) Field of Classification Search
CPC . H04N 5/23212; H04N 5/23293; G03B 13/36
USPC ........ 348/345–356, 220.1, 222.1, 229.1, 294, 348/308, 302; 396/79, 111, 80
See application file for complete search history.

(56) References Cited

U.S. PATENT DOCUMENTS

| 8,525,917 | B2* | 9/2013 | Taniguchi | 348/345 |
| 2007/0109440 | A1* | 5/2007 | Hamano | 348/345 |
| 2007/0236598 | A1* | 10/2007 | Kusaka | 348/350 |
| 2007/0237511 | A1* | 10/2007 | Kusaka | 396/111 |
| 2008/0208506 | A1* | 8/2008 | Kuwata | 702/104 |
| 2009/0135273 | A1* | 5/2009 | Kusaka | 348/222.1 |

(Continued)

FOREIGN PATENT DOCUMENTS

| JP | 2000-156823 A | 6/2000 |
| JP | 2000-292686 A | 10/2000 |

(Continued)

*Primary Examiner* — Nhan T Tran
*Assistant Examiner* — Xi Wang
(74) *Attorney, Agent, or Firm* — Fitzpatrick, Cella, Harper & Scinto

(57) ABSTRACT

An image capturing apparatus comprises an image sensor on which a plurality of pixels are two-dimensionally arranged, and which has a plurality of image forming pixels and a plurality of types of focus detecting pixels that are discretely arranged among the plurality of image forming pixels and respectively have different distributions of received light, and selection means for, when the plurality of pixels are read out from the image sensor while thinning out the plurality of pixels, selecting one thinning-out read-out mode from a plurality of thinning-out read-out modes having different thinning-out phases of the plurality of pixels, wherein the plurality of types of focus detecting pixels are arranged so that in each thinning-out read-out mode, only signals of the focus detecting pixels of one type of focus detecting pixels are read out, and signals of the focus detecting pixels of other types are not read out.

4 Claims, 15 Drawing Sheets

(56) References Cited

U.S. PATENT DOCUMENTS

2010/0165176 A1    7/2010   Taniguchi
2010/0214431 A1    8/2010   Watanabe et al.
2010/0290773 A1*  11/2010   Ichimiya ................ 396/111
2011/0273602 A1*  11/2011   Takamiya et al. ............ 348/302

FOREIGN PATENT DOCUMENTS

| JP | 2007-282108 A | | 10/2007 | |
| JP | 2009-060597 A | | 3/2009 | |
| JP | 2009-103997 A | | 5/2009 | |
| JP | 2009177741 | * | 8/2009 | ............. H04N 5/335 |

* cited by examiner

|     | 0 | 1 | 2 | 3 | 4 | 5 | 6 | 7 | m-3 | m-2 | m-1 |
|-----|---|---|---|---|---|---|---|---|-----|-----|-----|
| 0   | R | G | R | G | R | G | R | G | G   | R   | G   |
| 1   | G | B | G | B | G | B | G | B | B   | G   | B   |
| 2   | R | G | R | G | R | G | R | G | G   | R   | G   |
| 3   | G | B | G | B | G | B | G | B | B   | G   | B   |
| 4   | R | G | R | G | R | G | R | G | G   | R   | G   |
| 5   | G | B | G | B | G | B | G | B | B   | G   | B   |
| 6   | R | G | R | G | R | G | R | G | G   | R   | G   |
| 7   | G | B | G | B | G | B | G | B | B   | G   | B   |
| n-3 | G | B | G | B | G | B | G | B | B   | G   | B   |
| n-2 | R | G | R | G | R | G | R | G | G   | R   | G   |
| n-1 | G | B | G | B | G | B | G | B | B   | G   | B   |

|  | PAIR OF PIXELS HAVING SMALL LIGHT AMOUNT DIFFERENCE | THINNING-OUT READ-OUT PHASE |
|---|---|---|
| DISTANCE MEASURING AREA 1 | SA2 AND SB2 | VM2 |
| DISTANCE MEASURING AREA 2 | SA3 AND SB3 | VM3 |
| DISTANCE MEASURING AREA 3 | SA3 AND SB3 | VM3 |

IMAGE CAPTURING APPARATUS

TECHNICAL FIELD

The present invention relates to a pixel signal read-out control technique of an image capturing apparatus having focus detecting pixels arranged on a part of an image sensor.

BACKGROUND ART

Nowadays, some image capturing apparatuses having a solid-state image sensor such as a CCD or CMOS sensor have a so-called live view function that allows the user to confirm an object image by sequentially outputting image signals continuously read out from the image sensor to a display device arranged on, for example, a back surface of a camera.

As general methods using a light beam that passes through an imaging lens of automatic focus detection/adjustment methods of image capturing apparatuses, a contrast detection method (called a defocus detection method) and phase difference detection method (called a shift detection method) are available. The contrast detection method is popularly used in video movie apparatuses (camcorders) and digital still cameras, and uses an image sensor as a focus detection sensor. This method focuses attention on an output signal from an image sensor, especially, information of high frequency components (contrast information), and decides a position of an imaging lens where an evaluation value of that information is maximized as an in-focus position. However, this method is not suited to a high-speed focus adjustment operation since it is also called a hill-climbing method, that is, since it calculates an evaluation value while moving an imaging lens by a small amount and is required to move the lens until a maximum evaluation value is consequently detected.

On the other hand, the phase difference detection method is popularly used in single-lens reflex cameras using silver halide films, and is a technique which most contributes to the practical use of AF (Auto Focus) single-lens reflex cameras. In the phase difference detection method, a light beam that passes through an exit pupil of an imaging lens is split into two beams, which are respectively received by a pair of focus detection sensors. Then, by detecting a shift amount between signals output according to the light-receiving amounts, that is, a relative positional shift amount in the splitting direction of the light beam, a shift amount of a focus direction of the imaging lens is directly calculated. Therefore, once the focus detection sensors perform accumulation operations, a focus shift amount and direction can be obtained, thus allowing a high-speed focus adjustment operation. However, in order to split a light beam that passes through the exit pupil of the imaging lens into two beams, and to obtain signals corresponding to the respective light beams, it is a general practice to arrange an optical path splitting means including a quick return mirror and half mirror in an imaging optical path, and to arrange a focus detection optical system and the focus detection sensors after the optical path splitting means. For this reason, the apparatus unwantedly becomes bulky and expensive. Also, in a live view mode, since the quick return mirror is retracted from the optical path, an AF operation is disabled, thus posing a problem.

In order to solve the above problem, a technique which gives a phase difference detection function to an image sensor to obviate the need for dedicated AF sensors, and to implement a high-speed phase difference detection, AF operation has been proposed. For example, in Japanese Patent Laid-Open No. 2000-156823, a pupil splitting function is given by decentering sensitive areas of light-receiving portions from optical axes of on-chip microlenses in some light-receiving elements (pixels) of an image sensor. Then, these pixels are used as focus detecting pixels, and are arranged at predetermined intervals in an image forming pixel group, thus attaining focus detection based on the phase difference detection method. Also, since positions where the focus detecting pixels are arranged correspond to deficient portions of image forming pixels, image information is constructed by interpolation from pieces of surrounding image forming pixel information.

In Japanese Patent Laid-Open No. 2000-292686, a pupil splitting function is given by splitting light-receiving portions of some pixels of an image sensor. Then, these pixels are used as focus detecting pixels, and are arranged at predetermined intervals in an image forming pixel group, thus attaining focus detection based on the phase difference detection method. With this technique as well, since positions where the focus detecting pixels are arranged correspond to deficient portions of image forming pixels, image information is constructed by interpolation from pieces of surrounding image forming pixel information.

However, in Japanese Patent Laid-Open Nos. 2000-156823 and 2000-292686 above, since pieces of image information for the positions where the focus detecting pixels are arranged as the deficient portions of image forming pixels, they are constructed by interpolation from surrounding image forming pixels, correct interpolation often fails depending on objects. For this reason, when the number of focus detecting pixels is sufficiently smaller than the number of normal image forming pixels, image quality deteriorates slightly. However, with increasing ratio of focus detecting pixels, the image quality deteriorates more seriously.

As is known, in order to attain a target frame rate in a live view mode, since pixel signals have to be read out from the image sensor at high speed, they are read out at high speed while thinning out some pixels in the image sensor. In this case, when pixels are arranged to include focus detecting pixels in readout pixel signals so as to allow an AF operation even in the live view mode, the ratio of focus detecting pixels to image forming pixels increases compared to a case in which all pixels are read out, thus influencing the image quality more seriously.

In general, a CMOS solid-state image sensor is manufactured via a plurality of mask processes. Since the manufacture is done while aligning positions between respective mask processes, positional deviations have occurred between members manufactured in early processes and those manufactured in latter processes. Since photo-electric conversion units of the solid-state image sensor are manufactured in the early processes and microlenses are formed in the last process, positional deviations often have normally occurred between the photo-electric conversion units and microlenses. For this reason, vignetting occurs depending on the positions of focus detecting pixels, thus disturbing accurate focus detection.

SUMMARY OF INVENTION

The present invention has been made in consideration of the aforementioned problems, and can attain accurate focus detection while suppressing an image quality drop when pixels are read out from an image sensor while thinning out some pixels.

According to the present invention there is provided an image capturing apparatus comprising: an image sensor on which a plurality of pixels are two-dimensionally arranged, and which has a plurality of image forming pixels that photo-electrically convert an object image formed by an imaging lens and output image forming signals, and a plurality of types of focus detecting pixels that are discretely arranged among the plurality of image forming pixels and respectively have different distributions of received light; and selection means for, when the plurality of pixels are read out from the image sensor while thinning out the plurality of pixels, selecting one thinning-out read-out mode from a plurality of thinning-out read-out modes having different thinning-out phases of the plurality of pixels, wherein the plurality of types of focus detecting pixels are arranged so that in each thinning-out read-out mode selected by the selection means, only signals of the focus detecting pixels of one type of the plurality of types of focus detecting pixels are read out, and signals of the focus detecting pixels of other types are not read out.

Further features of the present invention will become apparent from the following description of exemplary embodiments with reference to the attached drawings.

BRIEF DESCRIPTION OF DRAWINGS

FIGS. 3A and 3B are explanatory views of an all-pixel read-out mode according to the embodiment of the present invention;

FIGS. 4A and 4B are explanatory views of a thinning-out read-out mode according to the embodiment of the present invention;

DESCRIPTION OF EMBODIMENTS

Figure 1:
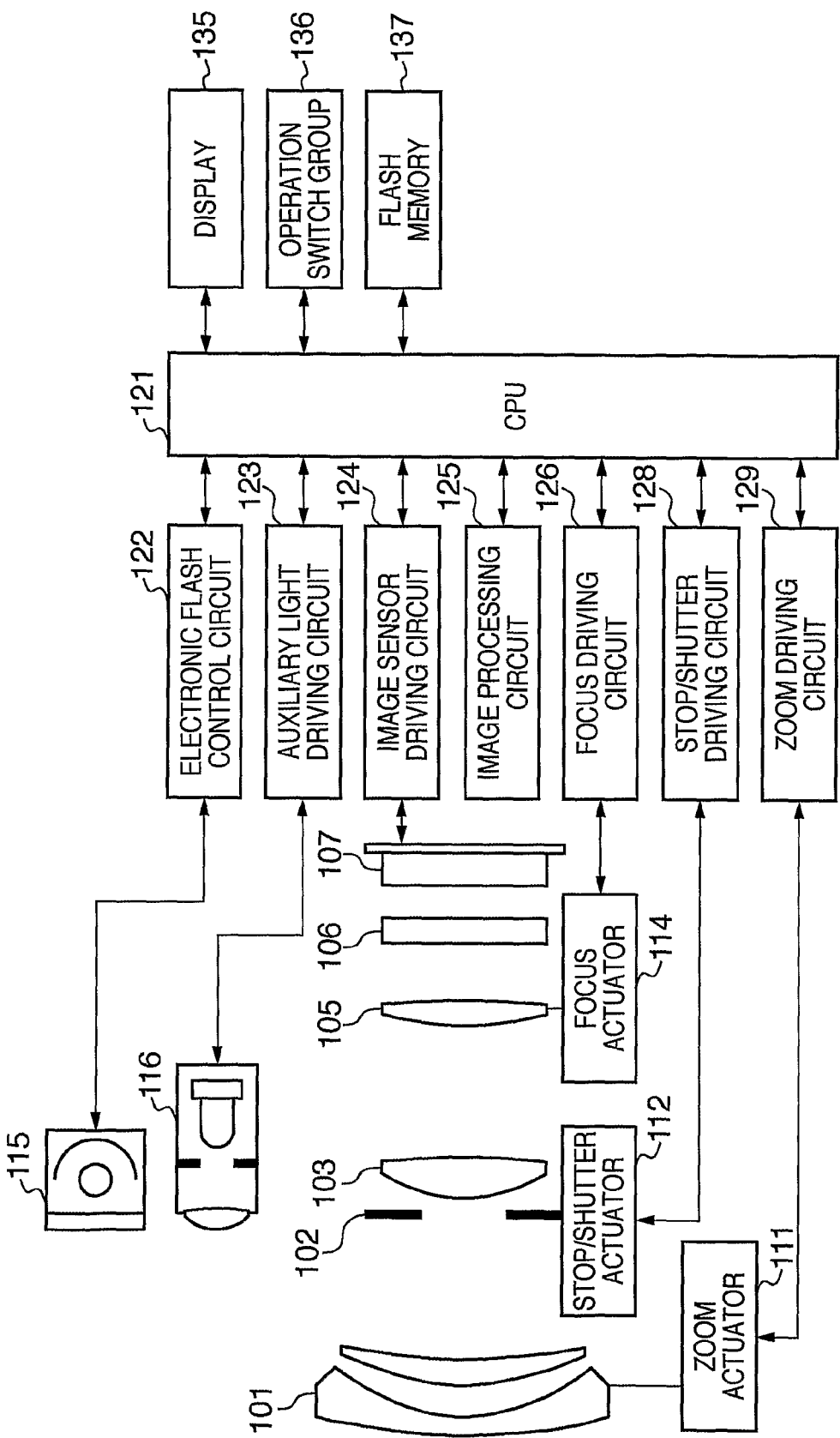
FIG. 1 is a block diagram showing the arrangement of a camera according to an embodiment of the present invention.

An embodiment of the present invention will be described hereinafter with reference to the drawings. FIG. 1 is a block diagram showing the arrangement of a camera (image capturing apparatus) according to an embodiment of the present invention, and shows a digital camera which integrates a camera body having an image sensor, and an imaging lens.

Referring to FIG. 1, reference numeral 101 denotes a first lens group, which is arranged at an end of an imaging optical system (image forming optical system), and is movable forward and backward in an optical axis direction. Reference numeral 102 denotes a stop/shutter, which adjusts a light amount at the time of imaging by adjusting its aperture size, and also serves as an exposure time adjustment shutter at the time of capturing a still picture. Reference numeral 103 denotes a second lens group. The stop/shutter 102 and second lens group 103 moves forward and backward together in the optical axis direction, so as to attain a variable magnification operation (zoom function) in synchronism with the forward/backward moving operation of the first lens group 101.

Reference numeral 105 denotes a third lens group, which attains focus adjustment when it is moved forward and backward in the optical axis direction. Reference numeral 106 denotes an optical low-pass filter, which is an optical element required to reduce false colors and moiré components of a captured image. Reference numeral 107 denotes an image sensor which includes a CMOS sensor and its peripheral circuit. As the image sensor 107, a two-dimensional one-chip color sensor, on which on-chip primary color mosaic filters of a Bayer matrix are formed on light-receiving pixels (m pixels in the horizontal direction×n pixels in the vertical direction), is used.

Reference numeral 111 denotes a zoom actuator, which attains a zoom operation by driving the first and second lens groups 101 and 103 forward and backward by pivoting a cam barrel (not shown). Reference numeral 112 denotes a stop/shutter actuator, which adjusts an imaging light amount by controlling the aperture size of the stop/shutter 102, and executes exposure time control at the time of capturing a still picture. Reference numeral 114 denotes a focus actuator which attains focus adjustment by driving the third lens group 105 forward and backward in the optical axis direction.

Reference numeral 115 denotes an electronic flash used to illuminate an object at the time of imaging. As the electronic flash 115, a flash illumination device using a xenon tube is preferably used. Alternatively, an illumination device including an LED which continuously emits light may be used. Reference numeral 116 denotes an AF auxiliary light device, which projects an image of a mask having a predetermined opening pattern to an object field via a projection lens to enhance a focus detection performance for a dark object or low-contrast object.

Reference numeral 121 denotes an intra-camera CPU which executes various kinds of control of the camera body, and includes an arithmetic unit, ROM, RAM, A/D converter, D/A converter, and communication interface circuit. The CPU 121 drives various circuits included in the camera based on predetermined programs stored in the ROM, thus executing a series of operations including AF, image capturing, image processing, and recording operations.

Reference numeral 122 denotes an electronic flash control circuit, which ON-controls the electronic flash 115 in synchronism with an imaging operation. Reference numeral 123 denotes an auxiliary light driving circuit, which ON-controls the AF auxiliary light device 116 in synchronism with a focus detection operation. Reference numeral 124 denotes an image sensor driving circuit, which controls the imaging operation of the image sensor 107, A/D-converts an acquired image signal, and sends the digital image signal to the CPU 121. Reference numeral 125 denotes an image processing circuit, which applies processing such as correction processing, γ conversion, color interpolation, and JPEG compression to an image acquired by the image sensor 107.

Reference numeral 126 denotes a focus driving circuit, which controls driving of the focus actuator 114 based on a focus detection result to drive the third lens group 105 forward and backward in the optical axis direction, thus attaining focus adjustment. Reference numeral 128 denotes a stop/shutter driving circuit, which controls driving of the stop/shutter actuator 112 to control the aperture size of the stop/shutter 102. Reference numeral 129 denotes a zoom driving circuit, which drives the zoom actuator 111 in accordance with a zoom operation of a photographer.

Reference numeral 135 denotes a display such as an LCD, which displays information associated with an imaging mode of the camera, a preview image before imaging, a confirmation image after imaging, and an in-focus state display image at the time of focus detection. Reference numeral 136 denotes an operation switch group, which includes a power switch, release (imaging trigger) switch, zoom operation switch, and imaging mode selection switch. Reference numeral 137 denotes a detachable flash memory, which records captured images.

Figure 2:
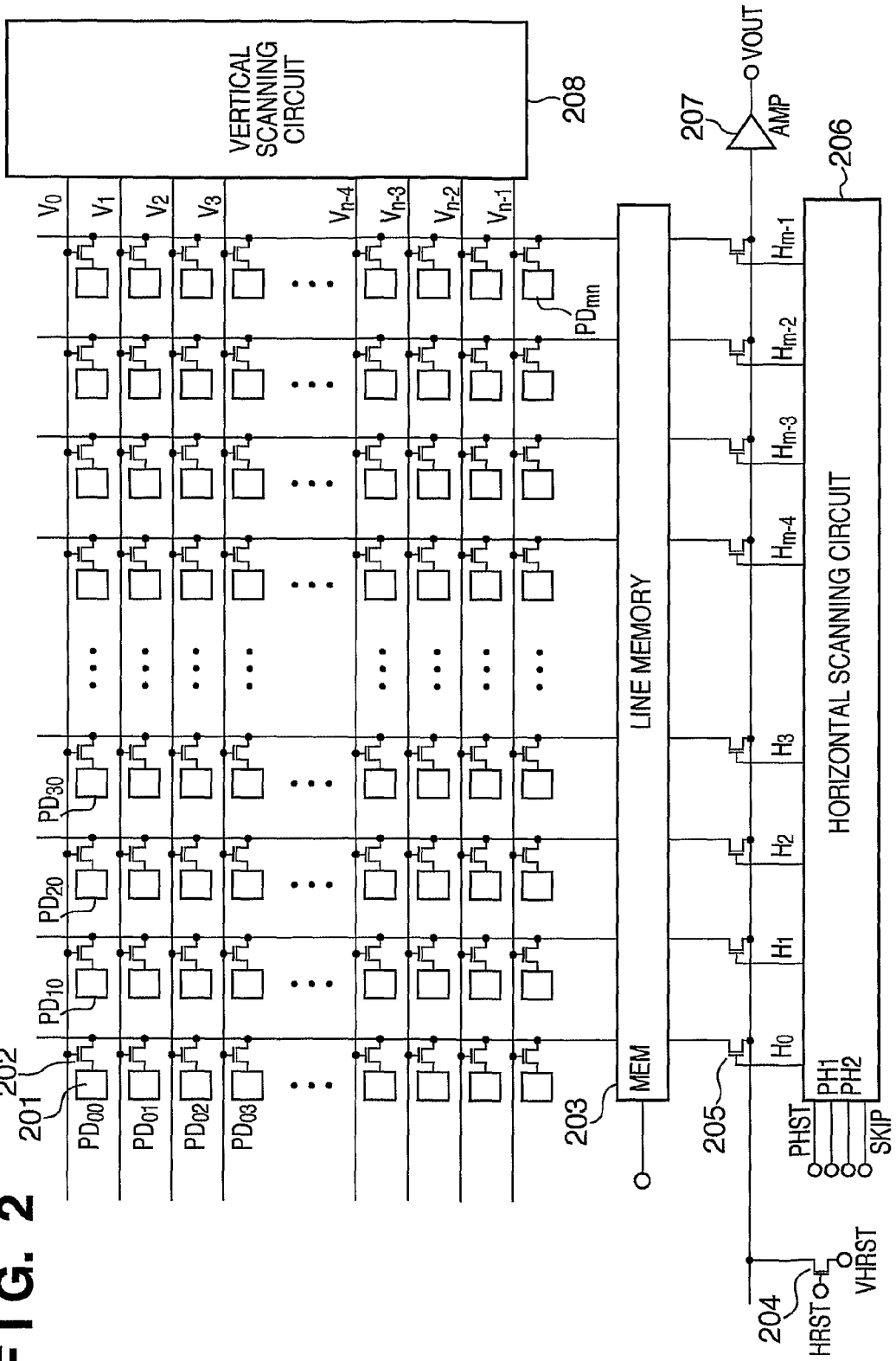
FIG. 2 is a block diagram of a solid-state image sensor according to the embodiment of the present invention.

FIG. 2 is a block diagram of the image sensor according to this embodiment. Note that the block diagram of FIG. 2 illustrates a minimum required arrangement that allows to explain read-out operations (to be described later), and pixel reset signals and the like are not shown. Referring to FIG. 2, reference numeral 201 denotes photo-electric conversion units (to be abbreviated as $PD_{mn}$ hereinafter; m is an X-direction address (m=0, 1, ..., m−1), and n is a Y-direction address (n=0, 1, ..., n−1)), and each of which includes a photodiode, pixel amplifier, and reset switch. In the image sensor of this embodiment, m×n photo-electric conversion units are two-dimensionally arranged. Reference numerals are additionally described only for an upper left photo-electric conversion unit $PD_{00}$ for the sake of simplicity.

Reference numeral 202 denotes switches, each of which is used to select the output of the photo-electric conversion unit $PD_{mn}$. A vertical scanning circuit 208 (to be described later) selects the outputs of the photo-electric conversion units $PD_{mn}$ row by row. Reference numeral 203 denotes a line memory which temporarily stores the outputs of the photo-electric conversion units $PD_{mn}$ 201. The line memory 203 stores the outputs of the photo-electric conversion units for one row, which are selected by the vertical scanning circuit. Normally, the line memory 203 uses capacitors. Reference numeral 204 denotes a switch, which is connected to a horizontal output line, and is used to reset the horizontal output line to a predetermined potential VHRT. The switch 204 is controlled by a signal HRT. Reference numeral 205 denotes switches, which are used to sequentially output the outputs of the photo-electric conversion units $PD_{mn}$ stored in the aforementioned line memory 203 onto the horizontal output line. When a horizontal scanning circuit 206 (to be described later) sequentially scans the switches $H_0$ to $H_{m-1}$, the outputs of the photo-electric conversion units for one row are read out.

Reference numeral 206 denotes a horizontal scanning circuit, which sequentially scans the outputs of the photo-electric conversion units stored in the line memory 203 to output them onto the horizontal output line. Reference symbol PHST denotes a data input of the horizontal scanning circuit 206; and PH1 and PH2, shift clock inputs. When PH1=H, data is set, and is latched in response to PH2. By inputting shift clocks to PH1 and PH2, the signal PHST is sequentially shifted to sequentially turn on the switches $H_0$ to $H_{m-1}$. Reference symbol SKIP denotes a control terminal input which controls to make settings in a thinning-out read-out mode (to be described later). By setting the SKIP terminal at an H level, the horizontal scanning circuit can be skipped at predetermined intervals. Details of the read-out operation will be described later.

Reference numeral 208 denotes a vertical scanning circuit, which can select the selection switches 202 of the photo-electric conversion units $PD_{mn}$ by sequentially scanning and outputting signals $V_0$ to $V_{n-1}$. As for control signals, the vertical scanning circuit 208 is controlled by a data input PVST, shift clocks PV1 and PV2, and thinning-out read setting signal SKIP as in the horizontal scanning circuit 206. Since the operation of the vertical scanning circuit 208 is the same as that of the horizontal scanning circuit, a detailed description thereof will not be given. FIG. 2 does not show the aforementioned control signals.

Figure 3A:
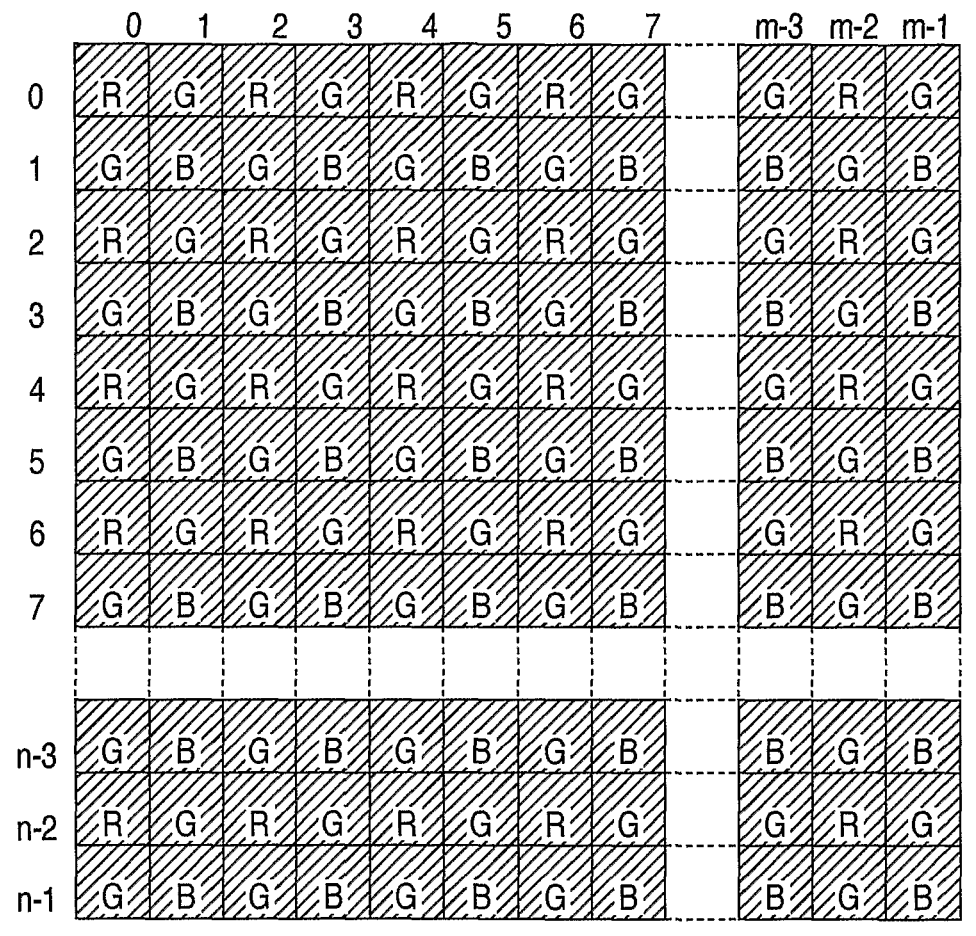
Figure 3B:
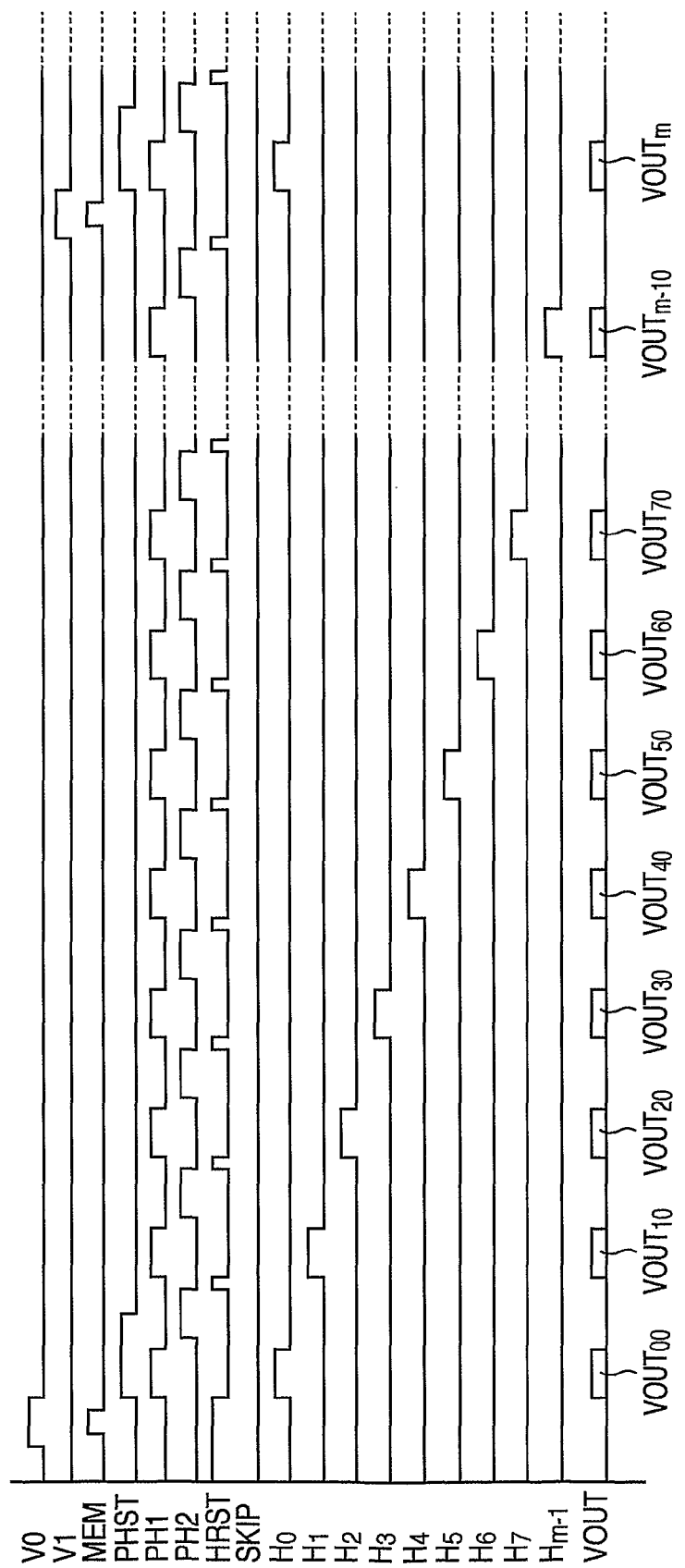

FIGS. 3A and 3B are explanatory views when all pixels of the image sensor shown in FIG. 2 are read out. FIG. 3A shows the arrangement of m×n photo-electric conversion units. Symbols R, G, and B additionally described in FIG. 3A represent color filters applied on the photo-electric conversion units. This embodiment will explain a Bayer matrix in which pixels having a G (green) spectral sensitivity are arranged as two diagonal pixels of four pixels of 2 rows×2 columns, and pixels respectively having R (red) and B (blue) spectral sensitivities are arranged as the remaining two pixels. Numerals additionally described on the upper and left sides in FIG. 3A are address numbers in the X and Y directions. Hatched pixel portions are those to be read out (all pixels are hatched because of an all-pixel read-out mode). Normally, light-shielded OB (optical black) pixels used to detect a black level are also arranged in the image sensor, and are also read out. However, in this embodiment, such pixels are not shown for the sake of simplicity.

FIG. 3B is a timing chart when data of all pixels of the image sensor are read out. This operation is controlled when the CPU 121 controls the image sensor driving circuit 124 to supply pulses to the image sensor. The all-pixel read-out operation will be described below with reference to FIG. 3B.

The vertical scanning circuit is driven to activate a signal $V_0$. At this time, the outputs of the pixels in the 0th row are respectively output onto vertical output lines. In this state, a MEM signal is activated to sample and hold the data of the respective pixels in the line memory 203. Then, the signal PHST is activated to input the shift clocks PH1 and PH2, and the switches $H_0$ to $H_{m-1}$ are activated to output the pixel signals onto the horizontal output line. The output pixel signals are output as signals VOUT via an amplifier 207. The signals VOUT are converted into digital data by an A/D converter (not shown) and undergo predetermined image processing by the image processing circuit 125. Next, in the vertical scanning circuit, a signal $V_1$ is activated to output pixel signals of the 1st row onto the vertical output lines. Likewise, the pixel signals are temporarily stored in the line memory 203 in response to the MEM signal. Then, the signal PHST is activated to input the shift clocks PH1 and PH2, and the switches $H_0$ to $H_{m-1}$ are activated to output the pixel signals onto the horizontal output line in the same manner as described above. As described above, read-out operations up to the $(n-1)^{th}$ row are sequentially executed.

Figure 4B:
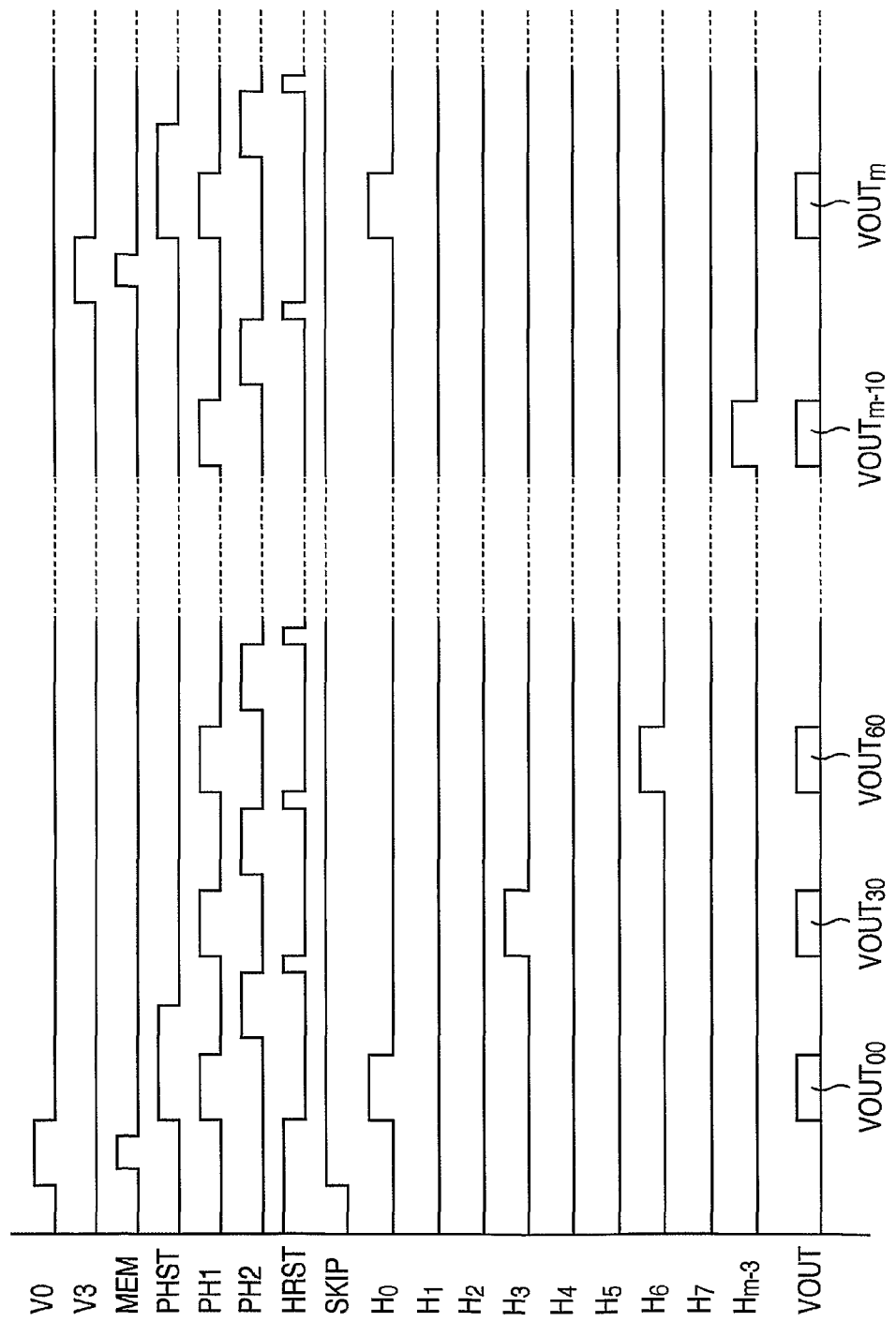

FIGS. 4A and 4B are explanatory views of an example of a thinning-out read-out operation of the image sensor shown in FIG. 2. FIG. 4A shows the arrangement of m×n photo-electric conversion units, that is, the same image sensor shown in FIG. 3A. Hatched pixel portions are pixels to be read out in a thinning-out read-out mode. In this embodiment, pixels to be read out are thinned out to ⅓ in both the X and Y directions.

FIG. 4B is a timing chart in the thinning-out read-out mode. The thinning-out read-out operation will be described below using the timing chart shown in FIG. 4B. Thinning-out read-out settings are made by activating the SKIP terminals of the control terminals of the horizontal scanning circuit 206 and vertical scanning circuit 208. By activating the SKIP terminals, the operations of the horizontal and vertical scanning circuits are changed from sequential scanning for each pixel to that for every third pixel. Since a practical method is a state-of-the-art technique, a detailed description thereof will not be given.

In the thinning-out operation, the vertical scanning circuit 208 is driven to activate the signal $V_0$. At this time, the outputs of the pixels in the 0th row are respectively output onto the vertical output lines. In this state, the MEM signal is activated to sample and hold the data of the respective pixels in the line memory 203. Then, the signal PHST is activated to input the shift clocks PH1 and PH2. At this time, by activating the SKIP terminal, a route of a shift register is changed, and pixel signals for every third pixels are sequentially output to the horizontal output line like $H_0, H_3, H_6, \ldots, H_{m-3}$. The output pixel signals are output as signals VOUT via the amplifier 207. The signals VOUT are converted into digital data by the A/D converter (not shown) and undergo predetermined image processing by the image processing circuit 125. Next, the vertical scanning circuit 208 skips signals $V_1$ and $V_2$ and activates a signal $V_3$ as in the horizontal scanning circuit 206 to output pixel signals in the 3rd row onto the vertical output lines. After that, the pixel signals are temporarily stored in the line memory 203 in response to the MEM signal. The signal PHST is activated to input the shift clocks PH1 and PH2, and the switches $H_0, H_3, H_6, \ldots, H_{m-3}$ are sequentially activated to output the pixel signals onto the horizontal output line in the same manner as described above. As described above, the read-out operations up to the $(n-3)^{th}$ row are sequentially executed. In this way, the ⅓ thinning-out read-out operations are done in both the horizontal and vertical directions.

FIGS. 5A and 5B and FIGS. 6A and 6B are views for explaining the structures of image forming pixels and focus detecting pixels. This embodiment adopts the Bayer matrix in which pixels having a G (green) spectral sensitivity are arranged as two diagonal pixels of four pixels of 2 rows×2 columns, and pixels respectively having R (red) and B (blue) spectral sensitivities are arranged as the remaining two pixels. Between these Bayer matrices, focus detecting pixels having a structure to be described later are dispersedly arranged according to predetermined rules.

Figures 5A, 5B:
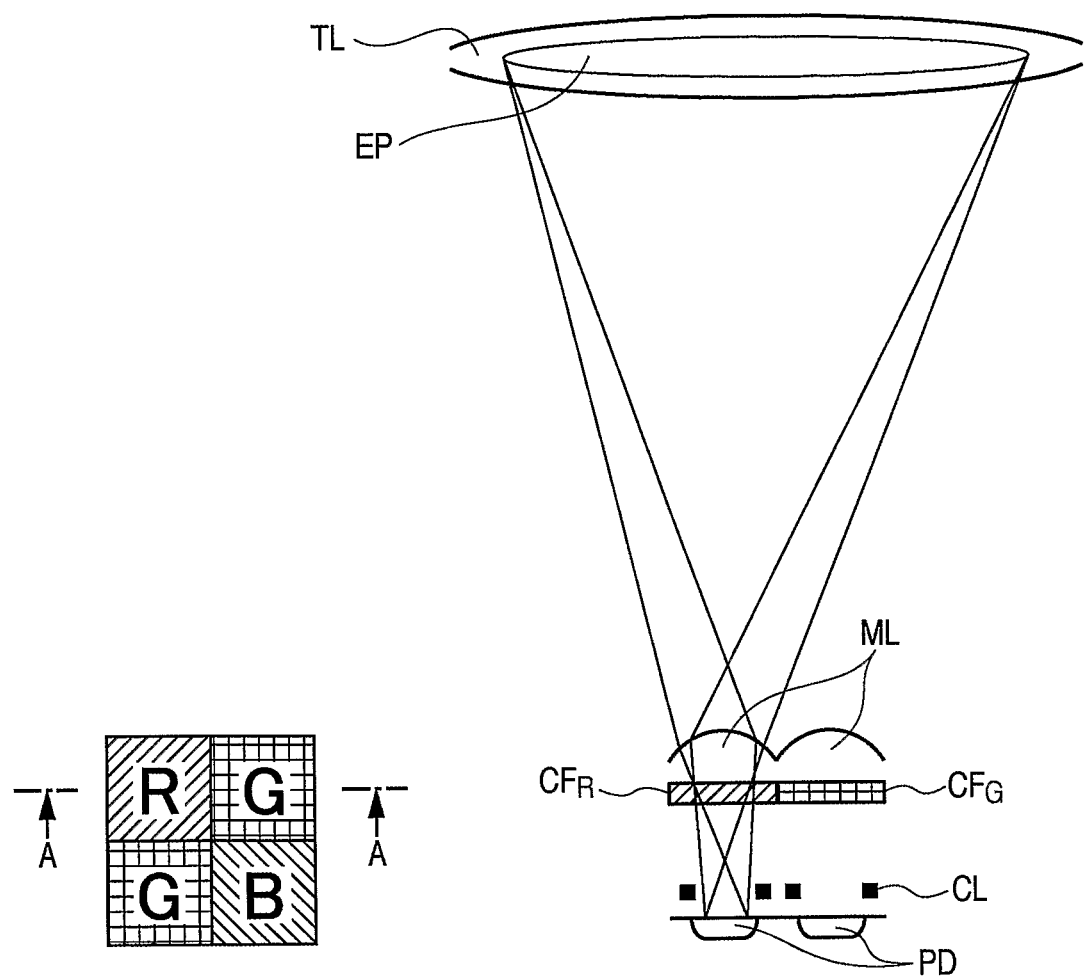
FIGS. 5A and 5B are a plan view and sectional view, respectively, of image forming pixels of the image sensor according to the embodiment of the present invention.

FIGS. 5A and 5B show the arrangement and structure of image forming pixels. FIG. 5A is a plan view of image forming pixels of 2 rows×2 columns. As is known, in the Bayer matrix, G pixels are arranged in a diagonal direction, and R and B pixels are arranged as the remaining two pixels. Then, this structure of 2 rows×2 columns is repetitively arranged. FIG. 5B shows a section A-A of FIG. 5A. Reference symbol ML denotes an on-chip microlens which is arranged on the frontmost surface of each pixel; $CF_R$, an R (red) color filter; and $CF_G$, a G (green) color filter. Reference symbol PD denotes a simple illustration of a photo-electric conversion unit of the CMOS sensor described using FIGS. 3A and 3B; and CL, a wiring layer used to form signal lines for transferring various signals in the CMOS sensor. Reference symbol TL denotes a simple illustration of an imaging optical system.

In this case, the on-chip microlens ML and photo-electric conversion unit PD of each image forming pixel are configured to effectively take in a light beam which passes through the imaging optical system TL as much as possible. In other words, an exit pupil EP of the imaging optical system TL and the photo-electric conversion unit PD have a conjugate relationship via the microlens ML, and the photo-electric conversion unit is designed to have a large effective area. FIG. 5B explains an incoming light beam of an R pixel, and G and B (blue) pixels also have the same structure. Therefore, the exit pupil EP corresponding to the R, G, and B image forming pixels has a large diameter and efficiently takes in a light beam from an object, thus improving the S/N of an image signal.

Figures 6A, 6B:
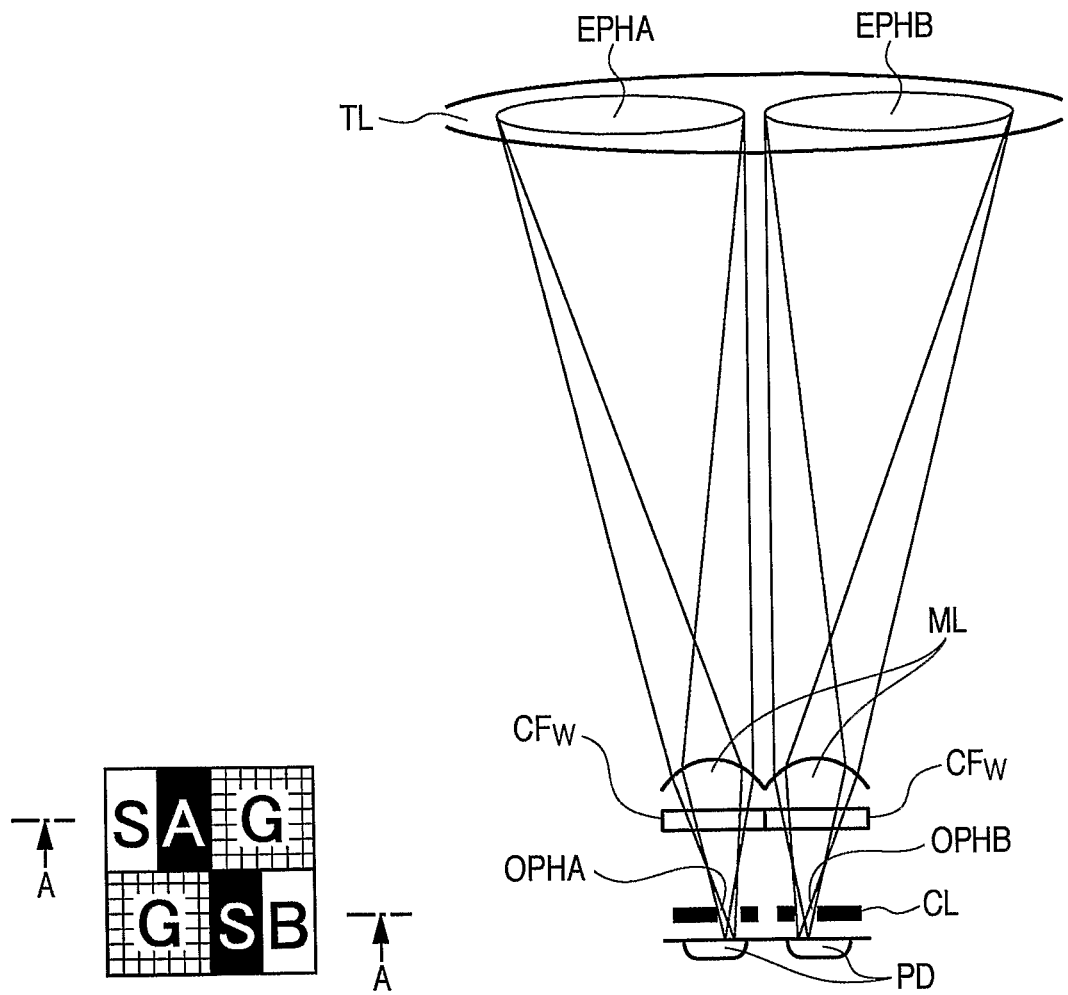
FIGS. 6A and 6B are a plan view and sectional view, respectively, of focus detecting pixels of the image sensor according to the embodiment of the present invention.

FIGS. 6A and 6B show the arrangement and structure of focus detecting pixels required to attain pupil splitting in the horizontal direction (widthwise direction) of the imaging lens. FIG. 6A is a plan view of pixels of 2 rows×2 columns including focus detecting pixels. When an image forming signal is to be obtained, G pixels serve as principal components of luminance information. Since human image recognition characteristics are sensitive to luminance information, one may readily notice deterioration of image quality if G pixels are omitted. On the other hand, an R or B pixel is that required to acquire color information. However, since one is insensitive to color information, he or she does not easily notice the deterioration of image quality even when pixels required to acquire color information are slightly omitted. Hence, in this embodiment, of the pixels of 2 rows×2 columns, G pixels are left as image forming pixels, and R and B pixels are partially used as focus detecting pixels. These pixels are denoted by SA and SB in FIG. 6A.

FIG. 6B shows a section A-A of FIG. 6A. The microlenses ML and photo-electric conversion units PD have the same structure as the image forming pixels shown in FIG. 5B. In this embodiment, since signals of the focus detecting pixels are not used in image construction, a transparent film $CF_W$ (White) is arranged in place of the color separation filter. In order to attain pupil splitting by the image sensor, an opening portion of the wiring layer CL is biased from the central line of the microlens ML. More specifically, since the pixel SA and its opening portion OPHA are biased to the right, that pixel receives a light beam which passes through a left exit pupil EPHA of the imaging lens TL. Likewise, since an opening portion OPHB of the pixel SB is biased to the left, that pixel receives a light beam which passes through a right exit pupil EPHB of the imaging lens TL. Hence, the pixels SA are regularly arranged in the horizontal direction, and let an A image be an object image acquired by these pixels. Also, the pixels SB are regularly arranged in the horizontal direction, and let a B image be an object image acquired by these pixels. By detecting relative positions of the A and B images, a focus shift amount (defocus amount) of an object image can be detected. When a focus shift amount in the vertical direction (lengthwise direction) is to be detected, the pixel SA and its opening portion OPHA can be configured to be biased to the upper side, and the pixel SB and its opening portion OPHB can be configured to be biased to the lower side.

Figure 7:
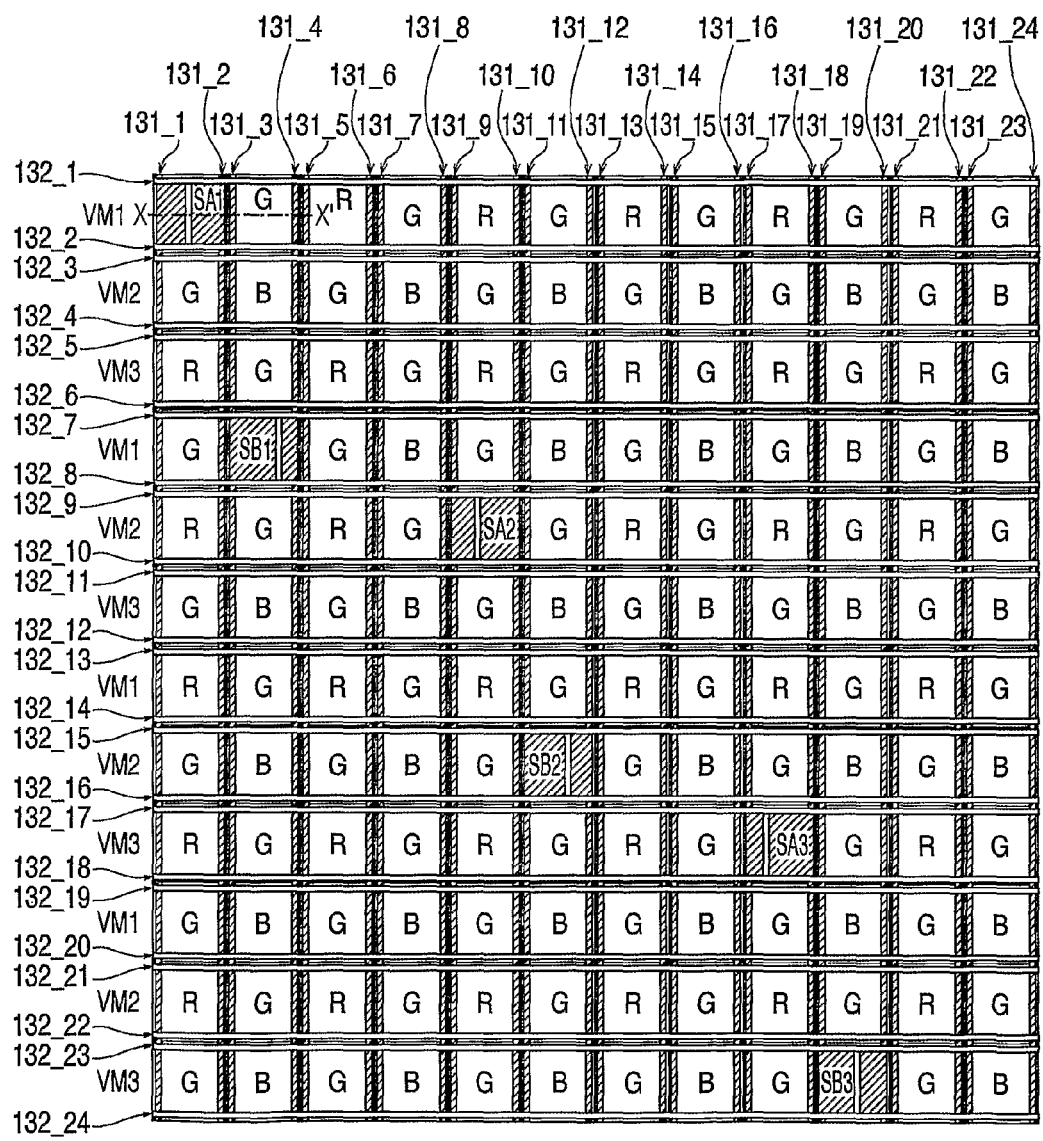
FIG. 7 is a view showing the pixel arrangement of image forming pixels and focus detecting pixels according to the embodiment of the present invention.

FIG. 7 is a pixel arrangement view showing the arrangement of image forming pixels and focus detecting pixels according to this embodiment. Referring to FIG. 7, reference symbol G denotes pixels applied with a green filter; R, pixels applied with a red filter; and B, pixels applied with a blue filter. Also, in FIG. 7, reference symbol SA denotes focus detecting pixels each of which is formed by biasing an opening portion of a pixel portion in the horizontal direction, and which form a standard pixel group used to detect an image shift amount in the horizontal direction from an SB pixel group to be described below. Reference symbol SB denotes pixels each of which is formed by biasing an opening portion of a pixel portion in a direction opposite to each SA pixel, and which form a reference pixel group used to detect an image shift amount in the horizontal direction from the SA pixel group. A hatched portion of each of the SA and SB pixels indicates the biased opening portion of the pixel. In this case, a reference pixel SB1 corresponds to a standard pixel SA1. Likewise, pixels SA2 and SB2, and pixels SA3 and SB3 respectively form pairs of pixels used to detect image shift amounts.

As for the pixel arrangement of the focus detecting pixels, this embodiment exemplifies that corresponding to a vertical ⅓ thinning-out mode, and pairs of pixels used to detect image shift amounts are arranged to have the same thinning-out phases. More specifically, VMk (k is a thinning-out phase number, and is an integer equal to or larger than 1 and equal to or smaller than a thinning-out cycle) in FIG. 7 indicates a thinning-out phase cycle indicating a combination of rows to be read out in the vertical ⅓ thinning-out mode at a certain phase. In this pixel arrangement, when a thinning-out phase cycle VM1 is read out, the pair of pixels SA1 and SB1 are read out. Likewise, when a thinning-out phase cycle VM2 is read out, the pair of pixels SA2 and SB2 are read out. Also, when a thinning-out phase cycle VM3 is read out, the pair of pixels SA3 and SB3 are read out.

In consideration of the fact that the focus detecting pixel group cannot be used for image formation, in this embodiment, the focus detecting pixels are discretely arranged to have certain intervals in the X and Y directions. Also, in order to obscure deterioration of an image, the focus detecting pixels are desirably not arranged on G pixel portions. In this embodiment, the three pairs of pixels SA and SB are arranged in a pixel blocks of 12 rows×12 columns shown in FIG. 7 to complete a pixel arrangement pattern by one block. Also, expansion to a full imaging screen can be attained by appropriately arranging respective blocks at arbitrary positions of the image sensor.

Figure 8A:
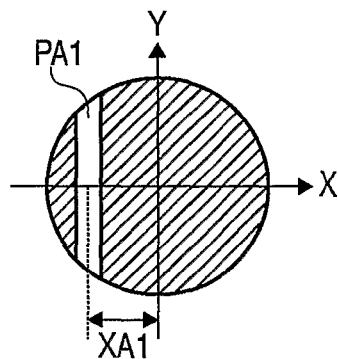
FIGS. 8A to 8G are explanatory views of the designed distributions of received light according to the embodiment of the present invention.

FIGS. 8A to 8G are explanatory views of designed distributions of received light, on the pupil of the imaging lens, of the focus detecting pixels discretely arranged on the image sensor 107 of this embodiment. FIG. 8A shows the designed distribution of received light on the pupil of the imaging lens of the focus detecting pixel SA1 shown in the pixel arrangement view of FIG. 7. A center of an opening defined by electrodes 131_1 and 131_2 of the focus detecting pixel SA1 is largely deviated in a +x direction from the center of the pixel. For this reason, the center of a light-receiving area PA1 of the photo-electric conversion unit of the focus detecting pixel SA1 is deviated by a distance −XA1 from an optical axis (an intersection between x and y axes in FIG. 8A) on the x axis in FIG. 8A on the exit pupil of the imaging lens.

Figure 8B:
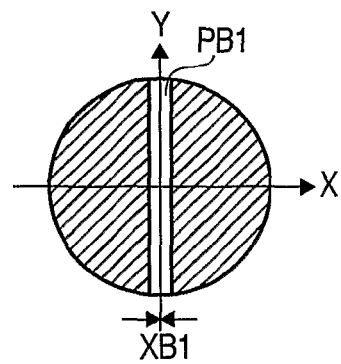

FIG. 8B shows the designed distribution of received light on the pupil of the imaging lens of the focus detecting pixel SB1 shown in the pixel arrangement view of FIG. 7. A center of an opening defined by electrodes 131_3 and 131_4 of the focus detecting pixel SB1 nearly matches the center of the pixel. For this reason, the center of a light-receiving area PB1 of the photo-electric conversion unit of the focus detecting pixel SB1 nearly matches the optical axis (the intersection between the x and y axes in FIG. 8B) on the x axis in FIG. 8B on the exit pupil of the imaging lens.

Figure 8C:
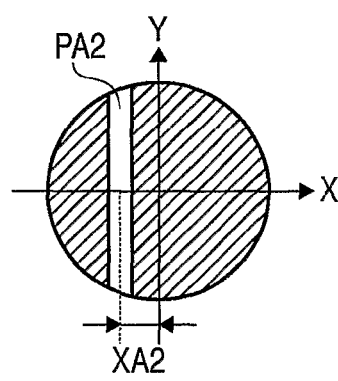

FIG. 8C shows the designed distribution of received light on the pupil of the imaging lens of the focus detecting pixel SA2 shown in the pixel arrangement view of FIG. 7. A center of an opening defined by electrodes 131_9 and 131_10 of the focus detecting pixel SA2 is deviated by a predetermined amount in the +x direction from the center of the pixel. For this reason, the center of a light-receiving area PA2 of the photo-electric conversion unit of the focus detecting pixel SA2 is deviated by a distance −XA2 from the optical axis (the intersection between the x and y axes in FIG. 8C) on the x axis in FIG. 8C on the exit pupil of the imaging lens.

Figure 8D:
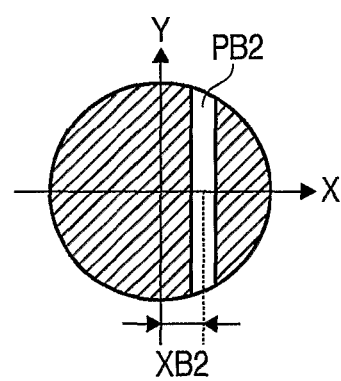

FIG. 8D shows the designed distribution of received light on the pupil of the imaging lens of the focus detecting pixel SB2 shown in the pixel arrangement view of FIG. 7. A center of an opening defined by electrodes 131_11 and 131_12 of the focus detecting pixel SB2 is deviated by a predetermined amount in a −x direction from the center of the pixel. For this reason, the center of a light-receiving area PB2 of the photo-electric conversion unit of the focus detecting pixel SB2 is deviated by a distance XB2 from the optical axis (the intersection between the x and y axes in FIG. 8D) on the x axis in FIG. 8D on the exit pupil of the imaging lens.

Figure 8E:
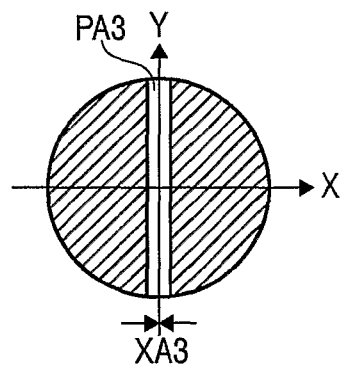

FIG. 8E shows the designed distribution of received light on the pupil of the imaging lens of the focus detecting pixel SA3 shown in the pixel arrangement view of FIG. 7. A center of an opening defined by electrodes 131_17 and 131_18 of the focus detecting pixel SA3 nearly matches the center of the pixel. For this reason, the center of a light-receiving area PA3 of the photo-electric conversion unit of the focus detecting pixel SA3 nearly matches the optical axis (the intersection between the x and y axes in FIG. 8E) on the x axis in FIG. 8E on the exit pupil of the imaging lens. In this case, the designed distribution of received light on the pupil of the imaging lens of the focus detecting pixel SA3 nearly matches that on the pupil of the imaging lens of the focus detecting pixel SB1.

Figure 8F:
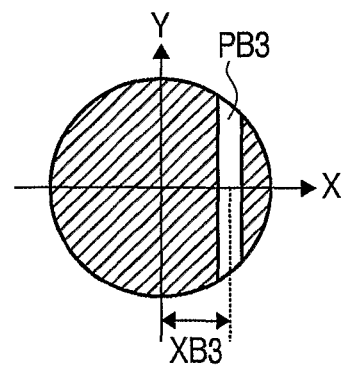

FIG. 8F shows the designed distribution of received light on the pupil of the imaging lens of the focus detecting pixel SB3 shown in the pixel arrangement view of FIG. 7. A center of an opening defined by electrodes 131_19 and 131_20 of the focus detecting pixel SB3 is largely deviated in the −x direction from the center of the pixel. For this reason, the center of a light-receiving area PB3 of the photo-electric conversion unit of the focus detecting pixel SB3 is deviated by a distance XB3 from the optical axis (the intersection between the x and y axes in FIG. 8F) on the x axis in FIG. 8F on the exit pupil of the imaging lens.

Figure 8G:
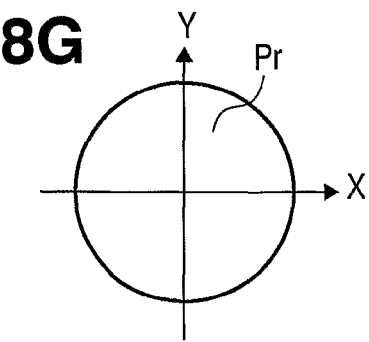

FIG. 8G shows the designed distribution of received light on the pupil of the imaging lens of a normal image forming pixel shown in the pixel arrangement view of FIG. 7. Since electrodes 131 of the normal image forming pixel are configured not to shield any light on the photo-electric conversion unit, the photo-electric conversion unit of the normal image forming pixel can receive light of a full pupil area Pr of the imaging lens. At this time, the center of the light-receiving area Pr of the normal image forming pixel nearly matches the optical axis (the intersection of the x and y axes in FIG. 8G) on the exit pupil of the imaging lens.

As described above, the image sensor 107 of this embodiment is configured to include six types of focus detecting pixel groups, the centers of the distributions of received light are located at different positions on the x-axis.

FIGS. 9A to 9G show the distributions of received light on the image sensor 107 obtained when a relative positional relationship between the on-chip microlens arranged on the frontmost surface of each pixel and the electrodes 131 is deviated in the −x direction from the designed value. FIGS. 9A to 9G are explanatory views of the distributions of received light on the pupil of the imaging lens of the focus detecting pixels which are located in the −x direction with respect to the center of the imaging screen. FIGS. 10A to 10C are graphs showing the line image distributions generated by the focus detecting pixel groups.

When the microlens is deviated in the −x direction from the designed value with respect to the electrodes 131, the distribution of received light of each focus detecting pixel of the image sensor 107 is uniformly deviated in the −x direction on the pupil of the imaging lens. In the focus detecting pixel groups which are located in the −x direction with respect to the center of the image sensor 107, a light beam from the −x direction side in FIGS. 9A to 9G suffers vignetting by a lens frame of the imaging lens.

Figure 9A:
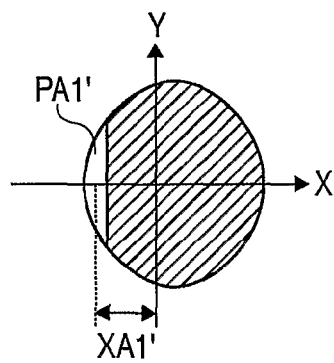
FIGS. 9A to 9G are explanatory views of the distributions of received light according to the embodiment of the present invention.
Figure 10A:
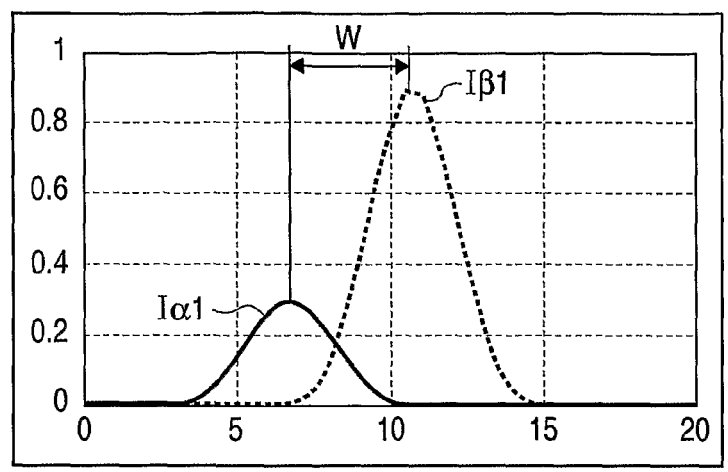
FIGS. 10A to 10C are explanatory graphs of the linear distributions of focus detecting pixels according to the embodiment of the present invention.
Figure 10B:
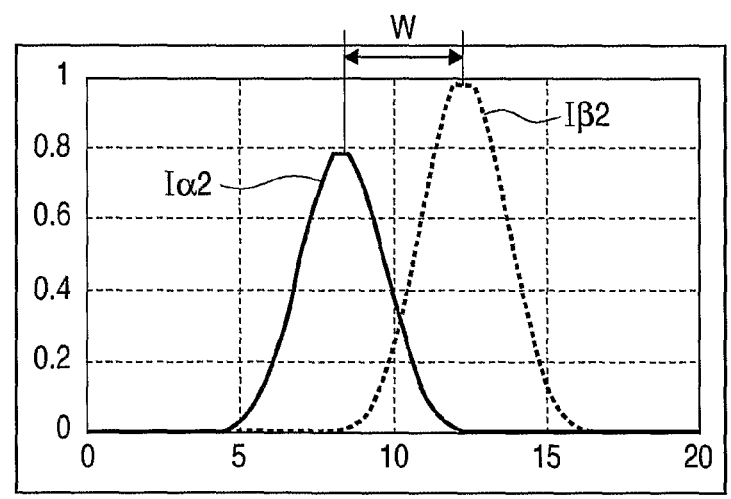
Figure 10C:
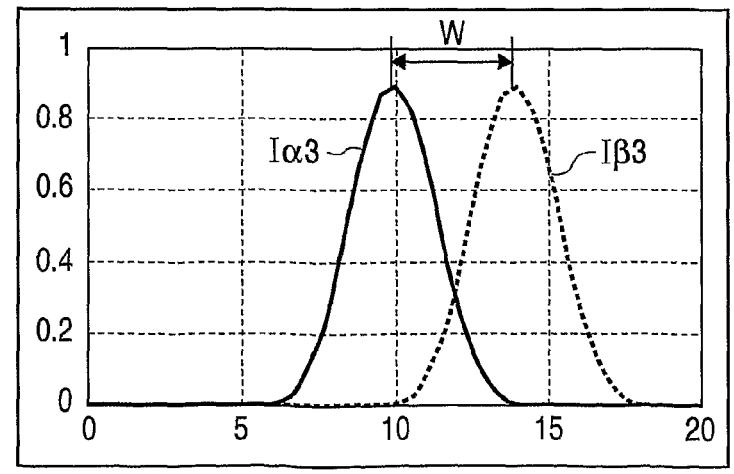

FIG. 9A shows the distribution of received light on the pupil of the imaging lens of the focus detecting pixel SA1 shown in the pixel arrangement view of FIG. 7. The center of the opening defined by the electrodes 131_1 and 131_2 is largely deviated in the +x direction from the center of the pixel. For this reason, the center of a light-receiving area PA1' of the photo-electric conversion unit of the focus detecting pixel SA1 is further deviated by a distance −XA1' in the −x direction from the optical axis (the intersection between the x and y axes in FIG. 9A) on the exit pupil of the imaging lens. Furthermore, since a light beam from the −x direction side in FIG. 9A suffers vignetting by the lens frame of the imaging lens, the light-receiving area of the focus detecting pixel SA1 is narrowed down.

Figure 9B:
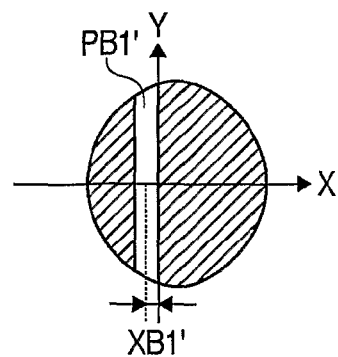

FIG. 9B shows the distribution of received light on the pupil of the imaging lens of the focus detecting pixel SB1 shown in the pixel arrangement view of FIG. 7. The center of a light-receiving area PB1' of the photo-electric conversion unit of the focus detecting pixel SB1, the center of which nearly matches the center of the opening defined by the electrodes 131_3 and 131_4, is further deviated by a distance −XB1' in the −x direction from the optical axis (the intersection between the x and y axes in FIG. 9B) on the exit pupil of the imaging lens.

FIG. 10A shows a line image distribution Iα1 generated by the focus detecting pixel group represented by the focus detecting pixel SA1 and a line image distribution Iβ1 generated by the focus detecting pixel group represented by the focus detecting pixel SB1. Since the area of the light-receiving area PA1' on the pupil of the imaging lens of the focus detecting pixel SA1 is largely different from that of the light-receiving area PB1' on the pupil of the imaging lens of the focus detecting pixel SB1, an output difference between the line image distributions Iα1 and Iβ1 becomes large. As a result, accurate focus detection cannot be expected even when a focus state of the imaging lens is detected using a focus detection image generated by the focus detecting pixel group represented by the focus detecting pixel SA1 and that generated by the focus detecting pixel group represented by the focus detecting pixel SB1.

Figure 9C:
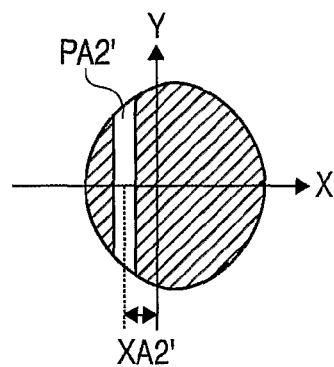

FIG. 9C shows the distribution of received light on the pupil of the imaging lens of the focus detecting pixel SA2 shown in the pixel arrangement view of FIG. 7. The center of the opening defined by the electrodes 131_9 and 131_10 is deviated by a predetermined amount in the +x direction from the center of the pixel. For this reason, the center of a light-receiving area PA2' of the photo-electric conversion unit of the focus detecting pixel SA2 is further deviated by a distance −XA2' in the −x direction from the optical axis (the intersection between the x and y axes in FIG. 9C) on the exit pupil of the imaging lens. Furthermore, since a light beam from the −x direction side in FIG. 9C suffers vignetting by the lens frame of the imaging lens, the light-receiving area of the focus detecting pixel SA2 is narrowed down.

Figure 9D:
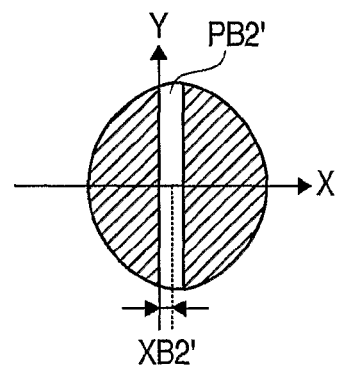

FIG. 9D shows the distribution of received light on the pupil of the imaging lens of the focus detecting pixel SB2 shown in the pixel arrangement view of FIG. 7. The center of the opening defined by the electrodes 131_11 and 131_12 is deviated by a predetermined amount in the −x direction from the center of the pixel. For this reason, the center of a light-receiving area PB2' of the photo-electric conversion unit of the focus detecting pixel SB2 is further deviated by a distance XB2' in the −x direction from the optical axis (the intersection between the x and y axes in FIG. 9D) on the exit pupil of the imaging lens.

FIG. 10B shows a line image distribution Iα2 generated by the focus detecting pixel group represented by the focus detecting pixel SA2 and a line image distribution Iβ2 generated by the focus detecting pixel group represented by the focus detecting pixel SB2. Since the area of the light-receiving area PA2' on the pupil of the imaging lens of the focus detecting pixel SA2 is slightly different from that of the light-receiving area PB2' on the pupil of the imaging lens of the focus detecting pixel SB2, the line image distributions Iα2 and Iβ2 have a slight output difference. As a result, slight errors are generated in a focus detection result when a focus state of the imaging lens is detected using a focus detection image generated by the focus detecting pixel group represented by the focus detecting pixel SA2 and that generated by the focus detecting pixel group represented by the focus detecting pixel SB2.

Figure 9E:
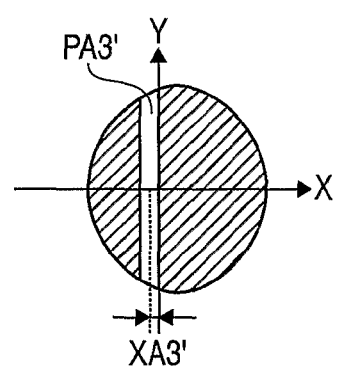

FIG. 9E shows the distribution of received light on the pupil of the imaging lens of the focus detecting pixel SA3 shown in the pixel arrangement view of FIG. 7. The center of a light-receiving area PA3' of the photo-electric conversion unit of the focus detecting pixel SA3, the center of which nearly matches the center of the opening defined by the electrodes 131_17 and 131_18, is further deviated by a distance −XA3' in the −x direction from the optical axis (the intersection between the x and y axes in FIG. 9E) on the exit pupil of the imaging lens. Furthermore, since a light beam from the −x direction side in FIG. 9E suffers vignetting by the lens frame of the imaging lens, the light-receiving area of the focus detecting pixel SA3 is narrowed down. In this case, the distribution of received light on the pupil of the imaging lens of the focus detecting pixel SA3 nearly matches that on the pupil of the imaging lens of the focus detecting pixel SB1.

Figure 9F:
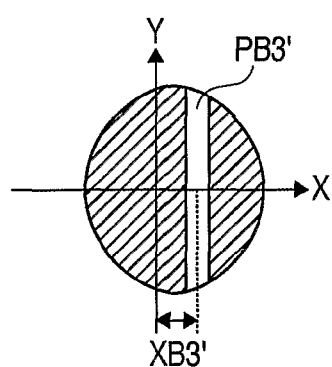

FIG. 9F shows the distribution of received light on the pupil of the imaging lens of the focus detecting pixel SB3 shown in the pixel arrangement view of FIG. 7. The center of the opening defined by the electrodes 131_19 and 131_20 is largely deviated in the −x direction from the center of the pixel. For this reason, the center of a light-receiving area PB3' of the photo-electric conversion unit of the focus detecting pixel SB3 is further deviated by a distance XB3' in the −x direction from the optical axis (the intersection between the x and y axes in FIG. 9F) on the exit pupil of the imaging lens.

FIG. 10C shows a line image distribution Iα3 generated by the focus detecting pixel group represented by the focus detecting pixel SA3 and a line image distribution Iβ3 generated by the focus detecting pixel group represented by the focus detecting pixel SB3. Since the area of the light-receiving area PA3' on the pupil of the imaging lens of the focus detecting pixel SA3 is nearly equal to that of the light-receiving area PB3' on the pupil of the imaging lens of the focus detecting pixel SB3, outputs of the line image distributions Iα3 and Iβ3 are nearly equal to each other. As a result, accurate focus detection can be expected when a focus state of the imaging lens is detected using a focus detection image generated by the focus detecting pixel group represented by the focus detecting pixel SA3 and that generated by the focus detecting pixel group represented by the focus detecting pixel SB3.

Figure 9G:
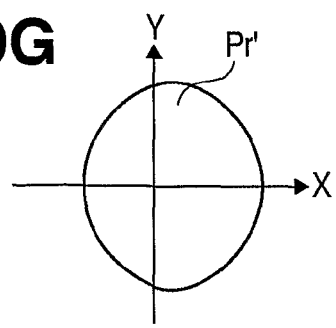

FIG. 9G shows the distribution of received light on the pupil of the imaging lens of the normal image forming pixel shown in the pixel arrangement view of FIG. 7. Since the electrodes 131 of the normal image forming pixel are configured not to shield any light on the photo-electric conversion unit, the photo-electric conversion unit of the normal image forming pixel can receive light of a full pupil area Pr' of the imaging lens. However, since a light beam from the −x direction side in FIG. 9G suffers vignetting by the lens frame of the imaging lens, the light-receiving area is narrowed down.

Figures 11A, 11B:
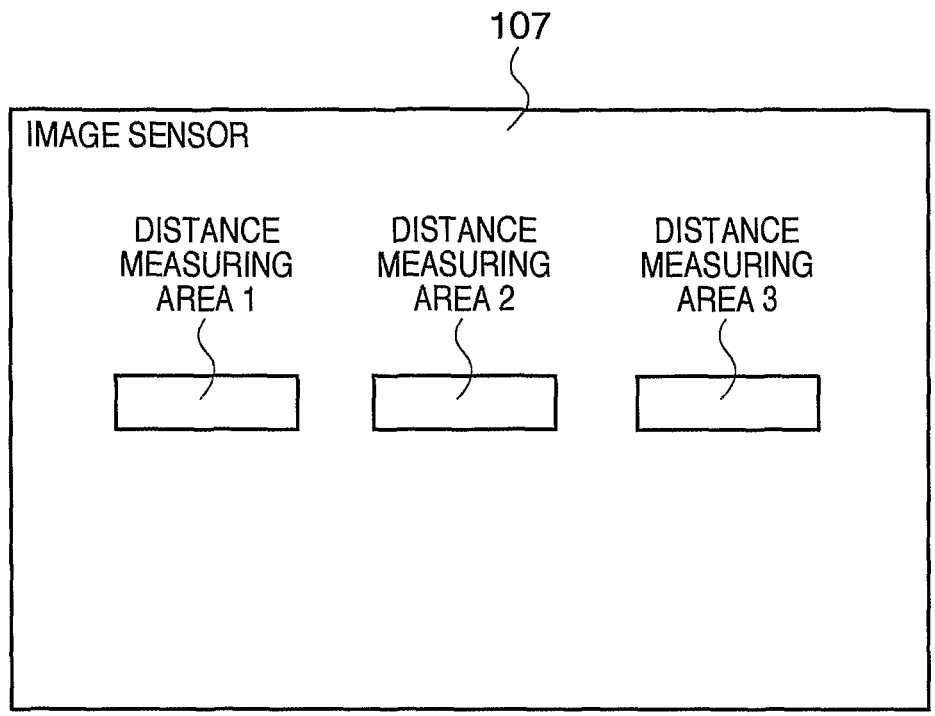
FIGS. 11A and 11B are explanatory views of the arrangement of distance measuring areas and a thinning-out read-out phase selection table according to the embodiment of the present invention.

FIGS. 11A and 11B are respectively a view showing the arrangement of distance measuring areas in this embodiment, and a selection table of the distance measuring areas and thinning-out read-out phases.

As shown in FIG. 11A, distance measuring areas are arranged on a central region, and right and left regions of the image sensor 107. In these areas, the basic blocks each configured by 12×12 pixels shown in the pixel arrangement view of FIG. 7 are appropriately arranged in the horizontal and vertical directions, and signals required to detect image shift amounts can be obtained by the focus detecting pixel groups.

FIG. 11B is a selection table showing the associations of the thinning-out read-out phases to be selected in the respective distance measuring areas. In the selection table, of thinning-out phases in which the focus detecting pixel groups having a plurality of types of distributions of received light are arranged, a thinning-out phase in which the pairs of pixels that can obtain a best focus detection image signal are arranged is associated. As a method of judging a best image, for example, a smallest output difference of image signals obtained from the respective pairs of pixels can be selected. The selection table is stored in the RAM of the CPU 121 of the image capturing apparatus of this embodiment, and is read out as needed.

The operation of the image capturing apparatus of this embodiment in the system with the aforementioned arrangement will be described below with reference to FIGS. 12 and 13.

Figure 12:
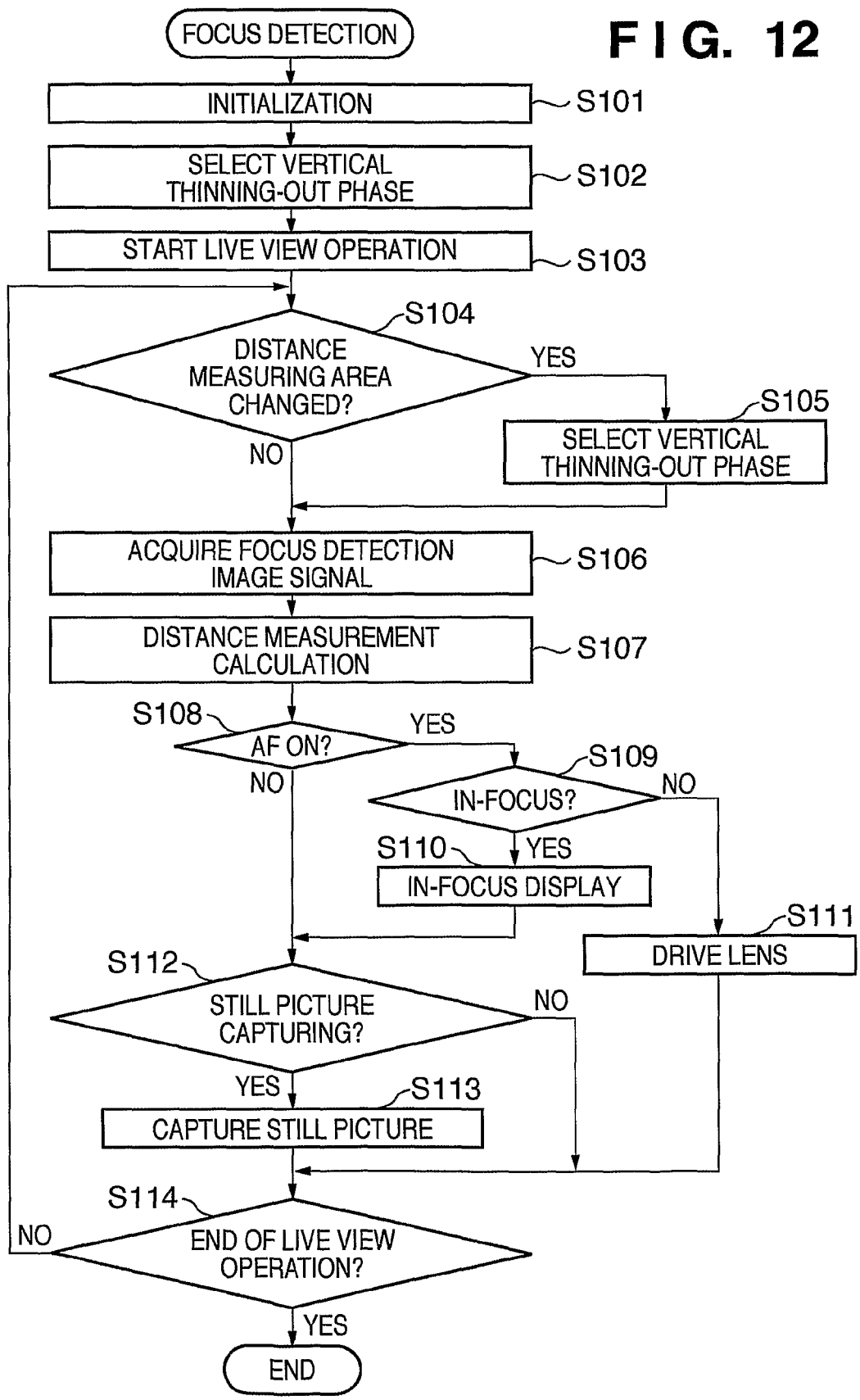
FIG. 12 is a flowchart showing the operation sequence according to the embodiment of the present invention.

When the power supply of the camera is turned on, programs are loaded onto the CPU 121 to execute initialization processing required for camera operations and to initialize respective control parameters in step S101 in FIG. 12. The process then advances to step S102. With this initialization processing, distance measuring area 2 on the central region is set as the distance measuring area.

In step S102, a thinning-out read-out phase upon execution of thinning-out read-out processing in a live view operation mode (to be described later) is selected. As for the thinning-out read-out phase, the corresponding thinning-out phase is set with reference to the thinning-out phase selection table stored in the RAM of the CPU 121. In this embodiment, since distance measuring area 2 is set by the initialization processing in step S101, the thinning-out read-out phase VM3 in which lines where the focus detecting pixels SA3 and SB3 that can obtain satisfactory focus detection images are arranged are read out is selected. Conversely, since lines where the focus detecting pixels SA1, SB1, SA2, and SB2 are arranged are not read out, deterioration of image quality due to reading out of unnecessary focus detecting pixels can be suppressed.

In step S103, a so-called live view operation in which signals are continuously read out from the image sensor to attain sequential display and recording operations is started. The live view operation and read-out control of image signals to be recorded as a movie will be described below.

Figure 13:
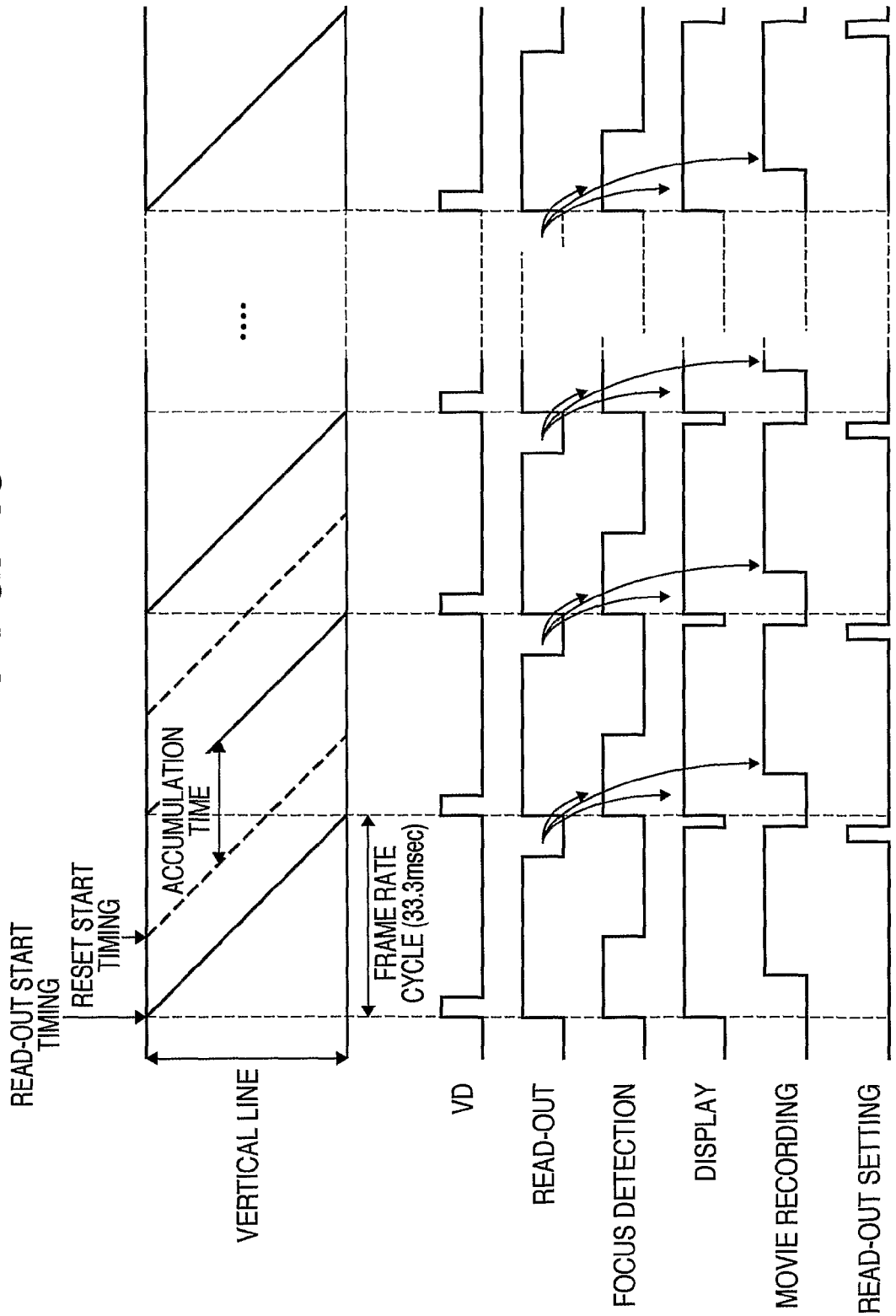
FIG. 13 is a timing chart showing the image capturing operation sequence in a live view mode according to the embodiment of the present invention.

FIG. 13 is a timing chart for explaining an overview of the image capturing operation sequence in the live view mode of this embodiment. As shown in FIG. 13, after an exposure operation of the image sensor 107 is done, accumulated charges of the pixels in the image sensor 107 are read out as an image signal. This read-out operation is performed in synchronism with a control pulse vertical sync signal VD and a horizontal sync signal HD (not shown). The VD signal represents one image forming frame. In this embodiment, the VD signal is sent from the image sensor driving circuit 124 to the image sensor 107 in response to a command from the CPU 121 at intervals of, for example, 1/30 sec. Also, the control pulse HD is a horizontal sync signal of the image sensor 107. The pulses HD as many as the number of horizontal lines are output at predetermined intervals during one frame period to control the horizontal lines. In synchronism with the horizontal pulses HD, pixel reset operations are made for respective horizontal lines (indicated by dotted lines) so as to attain a set accumulation time.

After the accumulated charges are read out in response to the VD and HD signals, the VD signal is output to start an accumulation operation of the next frame. The readout image signal is transferred to the image processing circuit 125 and undergoes defective pixel correction and image processing. Then, the image signal is sent to the display 135 arranged on, for example, the back surface of the camera. Since the aforementioned live view operation is a known technique, no more explanation will be given. As for movie recording, similarly readout signals, which have undergone image processing, are sequentially sent to and recorded in the RAM of the CPU 121.

In the image sensor 107 of this embodiment, a pupil splitting function is provided to some pixel groups in addition to image forming pixels to be able to attain a so-called phase difference AF mode. An image signal undergoes defect correction since these focus detecting pixels are regarded as defective pixels, and then undergoes image processing. The processed signal is then transferred to the display circuit.

In order to attain a target frame rate in the normal live mode, signals have to be read out from the image sensor at high speed while thinning out signals. Since such read-out operation has already been explained, a detailed description thereof will not be given. In this case, the shift register selects lines having the thinning-out read-out phase selected in step S102 so as to read out signals. On the other hand, since focus detecting pixels arranged in other thinning-out read-out phases are not read out, they are not included in the obtained image signal, thus suppressing deterioration of image quality.

It is determined in step S104 whether or not the distance measuring area has been changed by the operation switch group 136. If the distance measuring area has been changed, the process advances to step S105; otherwise, the process advances to step S106. In step S105, a corresponding thinning-out read-out phase is set with reference to the thinning-out read-out phase selection table as in step S102, thus selecting lines to be read out in the live view mode.

In step S106, data of the focus detecting pixels included in image data obtained by the thinning-out read-out operation in the live view mode are picked up to extract image signals required to detect a focus state of the imaging lens. Note that the image signals extracted in this step are best ones upon execution of focus detection of the focus detecting pixels which are arranged on the image sensor 107 and have the plurality of types of distributions of received light, thus assuring high focus detection accuracy.

In step S107, the image signals read out in step S106 are transferred to a phase difference detection block (not shown) in the image processing circuit 125. Then, this circuit block makes correlation calculations of pupil-split SA and SB pixel groups, thus calculating a phase difference AF evaluation value. It is determined in step S108 whether or not an AF operation is designated by the operation switch group 136. If the AF driving is designated, the process advances to step S109; otherwise, the process advances to step S112.

It is determined in step S109 based on the phase difference AF evaluation value calculated in step S107 whether or not an in-focus state is attained. If the in-focus state is determined, the process advances to step S110 to make a display indicating the in-focus state on the display 135. If the in-focus state is not determined, the CPU 121 controls the focus driving circuit 126 to activate the focus actuator 114, thus performing focus adjustment of the imaging lens.

It is determined in step S112 whether or not a still picture capturing operation is designated by the operation switch group 136. If the still picture capturing operation is designated, the process advances to step S113 to execute the still picture capturing operation and to record an image on a recording medium (not shown). After the still picture capturing operation, the control returns to the live view operation again, and the process advances to step S114.

It is determined in step S114 whether or not an end instruction of the live view operation is input by the operation switch group 136. If the end instruction is input, the camera undergoes end processing, and the power supply is then turned off. On the other hand, if no end instruction is input, the process returns to step S104 to continue the live view operation.

As described above, even when the solid-state image sensor has errors from the designed distributions of received light due to positional deviations between the photo-electric conversion units and microlenses in the manufacturing processes of the image sensor, the focus detecting pixel groups including the focus detecting pixels having the different distributions of received light are arranged, and the pair of pixels from which best focus detection images can be obtained are selected from the plurality of types of pairs of pixels, and are read out, thus obtaining satisfactory focus detection image signals.

More specifically, the plurality of types of pairs of pixels are arranged in different thinning-out read-out phases, and a thinning-out phase in which the focus detecting pixels that can obtain the best image signals are read out is selected, thereby reducing a ratio of focus detecting pixel signals included in image signals, and suppressing deterioration of image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-256542, filed Nov. 9, 2009, which is hereby incorporated by reference herein in its entirety.

The invention claimed is:

1. An image capturing apparatus comprising:
   an image sensor which has a plurality of image forming pixels that photo-electrically convert an object image formed by an imaging lens and output image forming signals, and a plurality of types of focus detecting pixels that are discretely arranged among the plurality of image forming pixels and respectively have different distributions of received light; and
   a selection unit which, when the plurality of pixels are read out from said image sensor while thinning out the plurality of pixels, selects one thinning-out read-out mode from a plurality of thinning-out read-out modes having different thinning-out phases of the plurality of pixels,
   wherein the image sensor comprises a plurality of blocks each having a predetermined number of pixels, each of the plurality of blocks having one of a first type of focus detecting pixel, a second type of focus detecting pixel and a third type of focus detecting pixel, and each of the first, second and third type of focus detecting pixels having different centers of light receiving areas,
   wherein the plurality of types of focus detecting pixels are arranged so that in each thinning-out read-out mode selected by said selection unit, only one type of the focus detecting pixels of the plurality of types of focus detecting pixels are read out, and signals of the focus detecting pixels of other types are not read out.

2. The apparatus according to claim 1, further comprising a focus detection unit which performs focus detection based on a phase difference detection method using signals of the focus detecting pixels read out in the thinning-out read-out mode selected by said selection unit.

3. The apparatus according to claim 1, the plurality of pixels on the image sensor are arranged two-dimensionally.

4. An image capturing apparatus comprising:
   an image sensor which has a plurality of image forming pixels that photo-electrically convert an object image formed by an imaging lens and output image forming signals, and a plurality of types of focus detecting pixels that are discretely arranged among the plurality of image forming pixels and respectively have different distributions of received light; and
   selection means for selecting, when the plurality of pixels are read out from said image sensor while thinning out the plurality of pixels, one thinning-out read-out mode from a plurality of thinning-out read-out modes having different thinning-out phases of the plurality of pixels,
   wherein the image sensor comprises a plurality of blocks each having a predetermined number of pixels, each of the plurality of blocks having one of a first type of focus detecting pixel, a second type of focus detecting pixel and a third type of focus detecting pixel, and each of the first, second and third type of focus detecting pixels having different centers of light receiving areas,
   wherein the plurality of types of focus detecting pixels are arranged so that in each thinning-out read-out mode selected by said selection means, only one type of the focus detecting pixels of the plurality of types of focus detecting pixels are read out, and signals of the focus detecting pixels of other types are not read out.

* * * * *